(12) United States Patent
Shukla et al.

(10) Patent No.: US 8,069,439 B2
(45) Date of Patent: Nov. 29, 2011

(54) FRAMEWORK FOR MODELING CONTINUATIONS IN WORKFLOWS

(75) Inventors: Dharma K. Shukla, Sammamish, WA (US); Robert B. Schmidt, Woodinville, WA (US); Mayank Mehta, Redmond, WA (US); Akash J. Sagar, Bellevue, WA (US); Karthik Raman, Bellevue, WA (US); Nathan Talbert, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1345 days.

(21) Appl. No.: 11/393,980

(22) Filed: Mar. 30, 2006

(65) Prior Publication Data

US 2007/0239499 A1    Oct. 11, 2007

(51) Int. Cl.
*G06F 9/44* (2006.01)
(52) U.S. Cl. .................................... 717/125
(58) Field of Classification Search .......... 717/124–128, 717/132–136; 719/310; 709/207, 218; 714/4, 714/46; 715/744; 707/202
See application file for complete search history.

(56) References Cited

U.S. PATENT DOCUMENTS

| | | | |
|---|---|---|---|
| 5,047,919 A | 9/1991 | Sterling et al. |
| 5,301,320 A | 4/1994 | McAtee et al. |
| 5,375,125 A | 12/1994 | Oshima et al. |
| 5,634,127 A | 5/1997 | Cloud et al. |
| 5,734,837 A | 3/1998 | Flores et al. |
| 5,870,607 A | 2/1999 | Netzer |
| 5,930,512 A | 7/1999 | Boden et al. |
| 6,016,394 A | 1/2000 | Walker |
| 6,028,997 A | 2/2000 | Leymann et al. |
| 6,073,109 A | 6/2000 | Flores et al. |
| 6,078,982 A | 6/2000 | Du et al. |
| 6,115,646 A | 9/2000 | Fiszman et al. |
| 6,253,369 B1 | 6/2001 | Cloud et al. |
| 6,353,924 B1 | 3/2002 | Ayers et al. |
| 6,397,192 B1 | 5/2002 | Notani et al. |
| 6,405,364 B1 | 6/2002 | Bowman-Amuah |
| 6,411,961 B1 | 6/2002 | Chen |
| 6,567,783 B1 | 5/2003 | Notani et al. |
| 6,604,104 B1 | 8/2003 | Smith |
| 6,621,505 B1 | 9/2003 | Beauchamp et al. |
| 6,662,188 B1 | 12/2003 | Rasmussen et al. |
| 6,678,882 B1 | 1/2004 | Hurley et al. |
| 6,708,186 B1 | 3/2004 | Claborn et al. |
| 6,768,986 B2 | 7/2004 | Cras et al. |
| 6,807,583 B2 | 10/2004 | Hrischuk et al. |

(Continued)

FOREIGN PATENT DOCUMENTS

EP     1238688 A     9/2002

(Continued)

OTHER PUBLICATIONS

Kuczun et al., "Network Design: Tasks & Tools", in proceedings of the conference on Designing interactive systems, 1997, pp. 215-222.

(Continued)

*Primary Examiner* — Tuan Anh Vu
(74) *Attorney, Agent, or Firm* — Senniger Powers LLP

(57) ABSTRACT

Enabling creation of control flow patterns in a workflow via continuations. Each continuation represents an activity execution context for an activity executing in the workflow by a workflow engine virtualizing a managed execution environment. Responsive to a request, the activity execution context is recreated via the continuation and the activity is executed within the recreated context.

19 Claims, 7 Drawing Sheets

U.S. PATENT DOCUMENTS

| | | | |
|---|---|---|---|
| 6,810,494 B2* | 10/2004 | Weinberg et al. | 714/46 |
| 6,845,507 B2 | 1/2005 | Kenton | |
| 6,895,438 B1 | 5/2005 | Ulrich | |
| 6,898,604 B1 | 5/2005 | Ballinger et al. | |
| 6,898,790 B1 | 5/2005 | Cheong et al. | |
| 6,918,053 B1 | 7/2005 | Thatte et al. | |
| 6,954,747 B1 | 10/2005 | Wang et al. | |
| 6,964,034 B1 | 11/2005 | Snow | |
| 6,976,257 B2 | 12/2005 | Leymann et al. | |
| 6,985,939 B2 | 1/2006 | Fletcher et al. | |
| 7,069,536 B2 | 6/2006 | Yaung | |
| 7,093,207 B1 | 8/2006 | Liao et al. | |
| 7,096,454 B2 | 8/2006 | Damm et al. | |
| 7,133,833 B1 | 11/2006 | Chone et al. | |
| 7,181,440 B2 | 2/2007 | Cras et al. | |
| 7,222,334 B2 | 5/2007 | Casati et al. | |
| 7,233,952 B1 | 6/2007 | Chen | |
| 7,240,324 B2 | 7/2007 | Casati et al. | |
| 7,272,816 B2 | 9/2007 | Schulz et al. | |
| 7,272,822 B1* | 9/2007 | Riggins et al. | 717/124 |
| 7,383,538 B2* | 6/2008 | Bates et al. | 717/128 |
| 7,441,236 B2* | 10/2008 | Chon et al. | 717/135 |
| 7,467,198 B2 | 12/2008 | Goodman et al. | |
| 7,685,576 B2* | 3/2010 | Hartmann et al. | 717/132 |
| 2002/0032692 A1 | 3/2002 | Suzuki et al. | |
| 2002/0065701 A1 | 5/2002 | Kim et al. | |
| 2002/0147606 A1 | 10/2002 | Hoffmann et al. | |
| 2002/0188644 A1 | 12/2002 | Seidman | |
| 2003/0018508 A1 | 1/2003 | Schwanke | |
| 2003/0033180 A1 | 2/2003 | Shekar et al. | |
| 2003/0084127 A1 | 5/2003 | Budhiraja et al. | |
| 2003/0135659 A1 | 7/2003 | Bellotti et al. | |
| 2003/0144891 A1 | 7/2003 | Leymann et al. | |
| 2003/0177046 A1 | 9/2003 | Socha-Leialoha | |
| 2003/0195762 A1 | 10/2003 | Gleason et al. | |
| 2003/0200527 A1 | 10/2003 | Lynn | |
| 2003/0208392 A1 | 11/2003 | Shekar et al. | |
| 2003/0217053 A1 | 11/2003 | Bachman et al. | |
| 2003/0233374 A1 | 12/2003 | Spinola | |
| 2004/0078105 A1 | 4/2004 | Moon et al. | |
| 2004/0078373 A1 | 4/2004 | Ghoneimy et al. | |
| 2004/0078778 A1 | 4/2004 | Leymann et al. | |
| 2004/0098358 A1 | 5/2004 | Roediger | |
| 2004/0111727 A1* | 6/2004 | Schwarzbauer et al. | 719/310 |
| 2004/0139426 A1 | 7/2004 | Wu | |
| 2004/0148214 A1 | 7/2004 | Aziz et al. | |
| 2004/0153350 A1 | 8/2004 | Kim et al. | |
| 2004/0162741 A1 | 8/2004 | Flaxer et al. | |
| 2004/0168155 A1 | 8/2004 | O'Farrell | |
| 2004/0220910 A1 | 11/2004 | Zang et al. | |
| 2004/0221261 A1 | 11/2004 | Blevins | |
| 2005/0015677 A1 | 1/2005 | Brown et al. | |
| 2005/0015775 A1 | 1/2005 | Russell et al. | |
| 2005/0027585 A1 | 2/2005 | Wodtke et al. | |
| 2005/0034098 A1 | 2/2005 | DeSchryver et al. | |
| 2005/0050311 A1 | 3/2005 | Joseph et al. | |
| 2005/0066002 A1 | 3/2005 | Teres et al. | |
| 2005/0071209 A1 | 3/2005 | Tatavu et al. | |
| 2005/0071347 A1 | 3/2005 | Chau et al. | |
| 2005/0097110 A1 | 5/2005 | Nishanov et al. | |
| 2005/0132252 A1 | 6/2005 | Fifer et al. | |
| 2005/0149475 A1 | 7/2005 | Chkodrov et al. | |
| 2005/0149908 A1 | 7/2005 | Klianev | |
| 2005/0154628 A1 | 7/2005 | Eckart et al. | |
| 2005/0177820 A1 | 8/2005 | Mei et al. | |
| 2005/0182773 A1 | 8/2005 | Feinsmith | |
| 2005/0192963 A1 | 9/2005 | Tschiegg et al. | |
| 2005/0193286 A1 | 9/2005 | Thatte et al. | |
| 2005/0193427 A1 | 9/2005 | John | |
| 2005/0204333 A1 | 9/2005 | Denby et al. | |
| 2005/0210455 A1 | 9/2005 | Koehler et al. | |
| 2005/0216482 A1 | 9/2005 | Ponessa | |
| 2005/0267889 A1 | 12/2005 | Snyder et al. | |
| 2005/0283343 A1 | 12/2005 | Cromer et al. | |
| 2006/0053120 A1 | 3/2006 | Shum et al. | |
| 2006/0059253 A1 | 3/2006 | Goodman et al. | |
| 2006/0064335 A1 | 3/2006 | Goldszmidt et al. | |
| 2006/0074704 A1 | 4/2006 | Shukla et al. | |
| 2006/0074734 A1 | 4/2006 | Shukla et al. | |
| 2006/0074735 A1 | 4/2006 | Shukla et al. | |
| 2006/0074736 A1 | 4/2006 | Shukla et al. | |
| 2006/0112122 A1 | 5/2006 | Goldszmidt et al. | |
| 2006/0122872 A1 | 6/2006 | Stevens et al. | |
| 2006/0143193 A1 | 6/2006 | Thakkar et al. | |
| 2006/0206863 A1 | 9/2006 | Shenfield et al. | |
| 2006/0225032 A1 | 10/2006 | Klerk et al. | |
| 2006/0236304 A1 | 10/2006 | Luo et al. | |
| 2006/0241954 A1 | 10/2006 | Jeng et al. | |
| 2007/0107052 A1 | 5/2007 | Cangini et al. | |
| 2007/0185923 A1* | 8/2007 | Nishikawa et al. | 707/202 |
| 2008/0320486 A1 | 12/2008 | Bose et al. | |

FOREIGN PATENT DOCUMENTS

| | | |
|---|---|---|
| WO | 2005033933 A1 | 4/2005 |

OTHER PUBLICATIONS

Author Unknown, Windows Workflow Foundation Web: The Official Microsoft Windows Workflow Site, WinFX Windows Workflow Foundation, http://www.windowsworkflow.net/default.aspx?tabindex=0&tabid=1, printed Mar. 1, 2006, 4 pages, Microsoft Corporation, USA.

Pan et al., "Controlling Program Execution Through Binary Instrumentation," Workshop on Binary Instrumentation and Applications (WBIA-2005), 14th International Conference on Parallel Architectures and Compilation Techniques (PACT-14), St. Louis, MO, Sep. 2005, printed from http://cag.csail.mit.edu/scale/papers/pin-wbia.pdf, 6 pages, U.S.A.

Narayanasamy et al., "BugNet: Continuously Recording Program Execution for Deterministic Replay Debugging," Proceedings of the International Symposium on Computer Architecture, Jun. 2005, pp. 1-12, U.S.A.

Manolescu, "Workflow Enactment with Continuation and Future Objects," OOPSLA, 2002, printed from http://micro-workflow.com/PDF/wecfo.pdf, 12 pages, Association for Computing Machinery, U.S.A.

Pivk, Aleksander, "Intelligent Agents In E-Commerce," Electronic Review Slovenia, Pub 2000, 18 pages.

Blake, "Coordinating Multiple Agents for Workflow-oriented Process Orchestration," Springer-Verlag, 2003, pp. 387-404.

Anonymous, "Open Source Workflow Engines in Java," available at http://web.archive.org/web/20051214041940/ http://java-source.net/open-source/workflow-engines>, Dec. 14, 2005, 6 pages.

Wikipedia, "Saved Game," available at http://en.wikipedia.org/w/index.php?title=Saved_game&oldid=42574026>, Mar. 7, 2006, 4 pages.

Goff et al., "Object Serialization and Decimalization using XML," Apr. 2001, CERN, Switzerland, pp. 1-14.

ISO/IEC, "Document Schema Definition Languages (DSDL)—Part 4: Namespace-based Validation Dispatching Language—NVDL," May 2004, available at http://dsdl.org, pp. i-vi, 1-45.

Box, D., et al., "Simplify Development With The Declarative Model Of Windows Workflow Foundation", MSDN Magazine, [Online], Jan. 2006, pp. 1-10, XP-002524524, retrieved from the Internet: URL:http://msdn.microsoft.com/en-us/magazine/cc163661.aspx>.

Taulty, M., "WF: Exceptions", Internet Article, [Online], Mar. 13, 2006, XP-002524741, retrieved from the Internet: URL:http://download.microsoft.com/download/c/1/9/c19a65d7-6c83-47c3-9969-7b038baf04c5/WF_Exceptions.zip>.

Taulty, M., "Mike Taulty's Blog—Windows Workflow Foundation Videos", Internet Article, [Online], Mar. 31, 2006, pp. 1-5, XP-002524526, retrieved from the Internet: URL:http://mtaulty.com/communityserver/blogs/mike_taultys_blog/archive/2006/03/31/5806.aspx>.

Anonymous, "Screencasts by Mike Taulty", Internet Article, [Online], Apr. 21, 2009, pp. 1-8, XP-002524527, retrieved from the Internet: URL:http://www.microsoft.com/uk/msdn/screencasts/presenter/11/mike-taulty.aspx?.

Taulty, M., "WF: Cancel Handlers", Internet Article, [Online], Mar. 21, 2006, XP-002524525, retrieved from the Internet: URL:http://download.microsoft.com/download/b/b/e/bbe7bc51-bb78-4510-9540-46e46929129d/ WF_Cancellation.zip>.

Marshak, R. T., "IBM's FlowMark Object-Oriented Workflow for Mission-Critical Applications", Workgroup Computing Report, May 1, 1994, pp. 3-13, vol. 17, No. 5, XP000568699, ISSN: 1057-8889.

Perkins, Alan, "Business Rules= Meta-Data," In: Proceedings of the Technology of Object-Oriented Languages and Systems, 2000, pp. 285-294.

Zhao, Zhiming, et al., "Dynamic Workflow in a Grid Enabled Problem Solving Environment," Proceedings of the 2005 The Fifth International Conference on Computer and Information Technology, 2005, 7 pages.

Kumar et al., "Dynamic Routing and Operational Controls in Workflow Management Systems", Management Science, vol. 45, No. 2, Feb 1999, pp. 253-272. Retrieved Sep. 25, 2009, from ABI/Inform Global.

Notification of Transmittal of The International Search Report and the Written Opinion of the International Searching Authority in International Application No. PCT/US2007/004637, dated Jul. 30, 2007, 9 pages.

Fahringer et al., "A-GWL: Abstract Grid Workflow Language", May 12, 2004; Computational Science—ICCS 2004; [Lecture Notes in Computer Science; LNCS]; Springer-Verlag, Berlin/Heidelberg, pp. 42-49.

* cited by examiner

FRAMEWORK FOR MODELING CONTINUATIONS IN WORKFLOWS

BACKGROUND

Existing systems attempt to model business processes or other real-world interactions between autonomous agents via high-level workflows. However, the workflows may vary in a variety of dimensions such as (a) execution and modeling complexity, (b) knowledge of the structure of the flow at design time, (c) statically defined or ad-hoc/dynamic, (d) ease of authoring and editing the flow at various points in its lifecycle, and (e) weak or strong association of business logic with the core workflow process. Existing workflow models fail to accommodate all these factors.

Further, most existing workflow models are based on either language-based approaches (e.g., BPEL4WS, XLANG/S, and WSFL) or application-based approaches. Language based approaches are high-level workflow languages with a closed set of pre-defined constructs which help model the workflow process to the user/programmer. The workflow languages carry all of the semantic information for the closed set of constructs to enable the user to build a workflow model. However, the languages are not extensible by the developers and represent a closed set of primitives that constitute the workflow model. The languages are tied to the language compiler shipped by the workflow system vendor. Only the workflow system product vendor may extend the model by extending the language with a new set of constructs in a future version of the product. This often requires upgrading the compiler associated with the language. In addition, the languages usually do not declaratively expose or define functions or operations that can be readily and efficiently used by other programs.

Application based approaches are applications that have the workflow capabilities within the application to solve a domain specific problem. These applications are not truly extensible nor do they have a programmable model.

SUMMARY

Embodiments of the invention enable the creation of control flow patterns in a workflow. In an embodiment, the invention generates continuations for program fragments during execution of the program fragments by a meta-runtime engine. The meta-runtime engine virtualizes a managed execution environment having fixed functionality. Responsive to a request from a user or other source, aspects of the invention recreate an activity execution context via the generated continuations and execute, within the recreated activity execution context, the program fragments or portions thereof.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
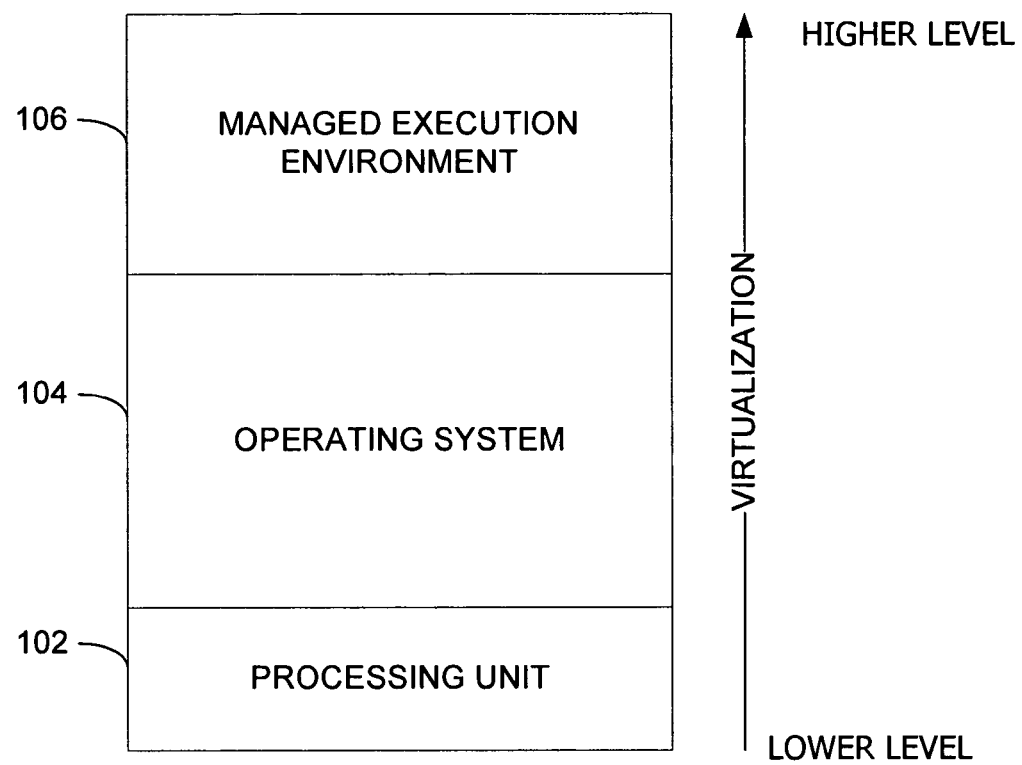
FIG. 1 is a block diagram illustrating an exemplary operating environment for aspects of the invention.

Referring first to FIG. 1, a block diagram illustrates a typical programming paradigm for modeling process-centric activities in a workflow. In this figure, the diagram shows a three-level virtualization model with a managed execution environment 106 at the highest level virtualizing an operating system 104. The managed execution environment 106 virtualizes the execution of a program executing in the environment 106 in terms of an abstract stack machine that may be implemented independent of the processor architecture of a computing device. The operating system 104 virtualizes a processing unit 102 at the lowest level. Programs at the managed execution environment 106 level lack the ability and efficiency to accommodate complex interactions between processes in a workflow due to the fixed functionality available in the managed execution environment 106. The managed execution environment 106 also includes various strict requirements unsuitable for handling the complexity and capability of workflows modeling real-world workflows. Further, the programming codes or routines in the operating system 104 are dependent on the type or configuration of the processing unit 102 and the type of computing architecture (e.g., compatible with IBM brand personal computers, APPLE brand personal computers, or other systems) among other constraints. In addition, programming languages typically require hardware-specific data structures such as a stack, heap, or thread for the operating system 104 to function properly.

Figure 2:
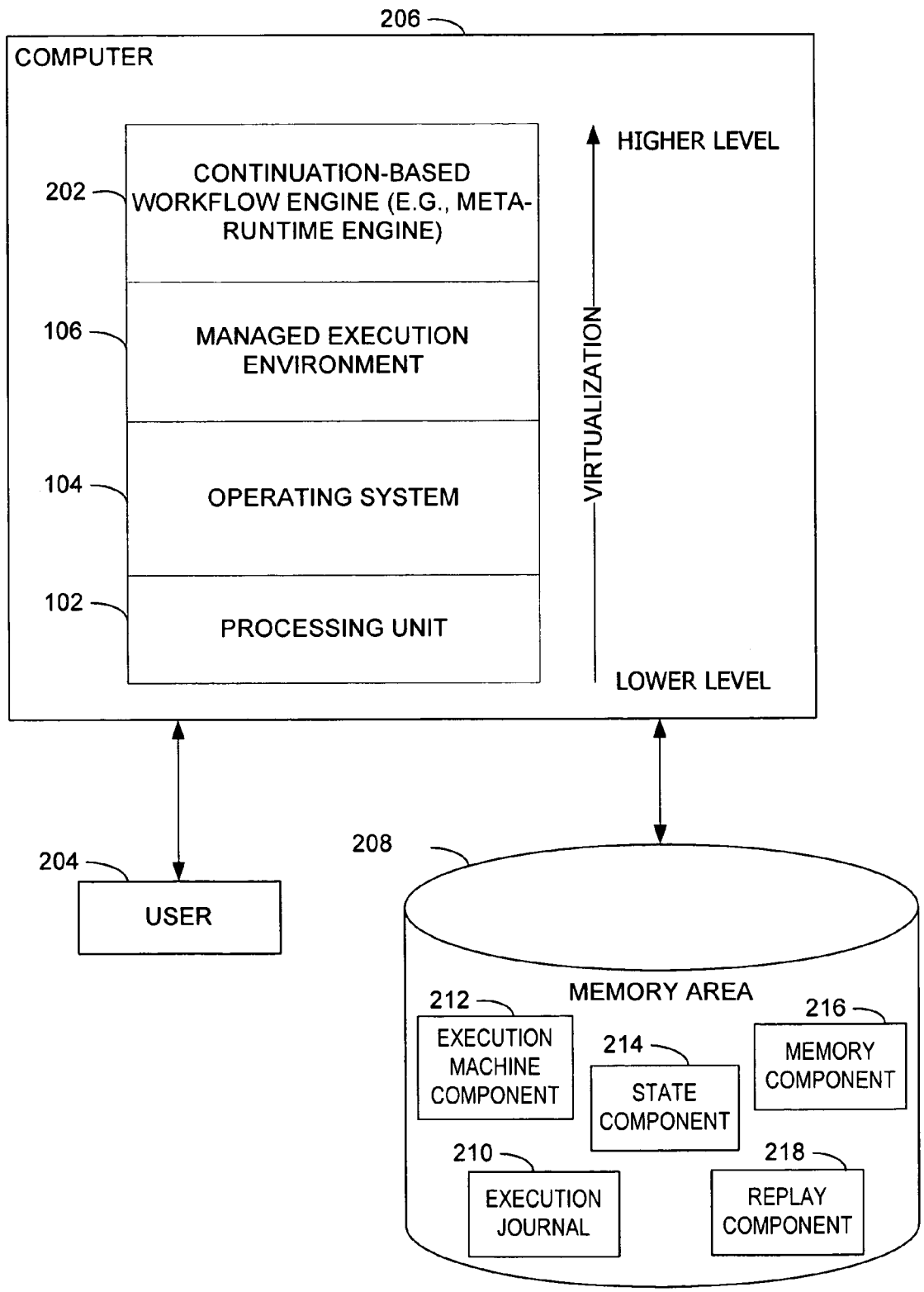
FIG. 2 is an exemplary block diagram illustrating a continuation-based workflow framework according to an embodiment of the invention.

Referring next to FIG. 2, aspects of the invention include a continuation-based workflow engine 202, meta-runtime engine, or other framework virtualizing the managed execution environment 106. The workflow includes a hierarchical composition of activities with each activity representing a unit of work. The workflow engine 202 provides an asynchronous, abstract model of execution of the operation codes (op-codes) or the activities in the workflow representing real-world processes. The workflow engine 202 is a continuation-based runtime that is capable of suspending the programs and resuming them at any point during the execution cycle. While an activity is domain-specific, the workflow engine 202 is agnostic of domain specificity. Moreover, the workflow engine 202 knows nothing about a specific control flow pattern that is packaged in terms of an activity. As such, the execution model provided by aspects of the invention is abstract. Further, while the entire workflow instance may logically run for an arbitrary amount of time (e.g., days, months, or years), the activities associated with the workflow may perform short-lived work and yield in a co-operative multitasking manner. The abstract execution model of aspects of the invention allows the workflow engine 202 to suspend an instance in the middle of execution and/or evict it from memory and resume it in the future. The workflow engine 202 manages such operations across program passivation.

In one embodiment, the workflow engine 202 operates to virtualize one or more of the following aspects of the managed execution environment 106: domain-specific op-codes, a thread, a synchronization primitive, an execution machine, an object lifetime, a source format, an exception, a fault, fault propagation, and fault handling. For example, aspects of the invention enable users to write custom op-codes in terms of custom activities. In general, the workflow engine 202 uses a thread, a stack, and/or a heap from the managed execution environment 106. With the capability to execute programs written in any programming language and composed in any file format, the workflow engine 202 enables program developers to design programs without compromise. By defining activities representing workflow tasks or processes as the base class to be executed by the workflow engine 202, aspects of the invention enable developers to easily and efficiently build domain specific op-codes without adhering to the rigid, hard-coded, inflexible, and fixed set of functions or activities classes in the managed execution environment 106. The op-codes may be specific to the healthcare industrial, financial industry, or other domains. The workflow engine 202 in FIG. 2 may be any continuation-based runtime layered on top of any existing execution framework (e.g., the managed execution environment 106, operating system 104, or processing unit 102 in FIG. 1) that enables the modeling of continuations and various aspects thereof to allow the programmer to model complex and dynamic control flow patterns. Aspects of the invention enable the definition of activities in any fashion or representation (e.g., a flow chart, a diagram, a numbered description, or the like).

Continuations may be used to model complex and dynamic control flow patterns. A continuation represents a program frozen in action and may include a single functional object containing the state of a computation. When the object is evaluated, the stored computation may be restarted where it left off. In solving certain types of problems, it can be a great help to be able to save the state of a program and restart it later. In multiprocessing, for example, a continuation conveniently represents a suspended process. In nondeterministic search programs, a continuation can represent a node in the search tree.

While the managed execution environment 106 creates a common, yet fixed, communication environment between programs, the ability to model real-world processes in such an environment is lacking. For example, applications executing in the managed execution environment 106 are limited to an intermediate language to share functions or common object-oriented classes. The intermediate language has fixed parameters, arguments, or schemas or functions.

Referring again to FIG. 2, a user 204 (e.g., a human, an application program, an operating system, or the like) interacts with a computer 206 providing the workflow foundation framework. The computer 206 and a processor associated therewith (not shown) have access to a memory area 208 storing an execution journal 210 and one or more computer-readable components or modules that have computer-executable instructions for implementing the workflow foundation. In the embodiment of FIG. 2, the computer-executable components or modules include an execution machine component 212, a state component 214, a memory component 216, and a replay component 218. The execution machine component 212, when executed by the computer 206, executes a plurality of program fragments associated with a workflow and virtualizes the managed execution environment 106 having fixed functionality. The state component 214 generates a plurality of continuations for the program fragments being executed by the execution machine component 212.

Each of the plurality of continuations includes a runtime state and an application state and generally represents an activity execution context or other state of the program fragment at a given point in time. The activity execution context is available independent of the stack associated with the physical thread from the managed execution environment 106. The runtime state indicates a scheduler queue status (e.g. the items in a queue associated with the scheduler) or otherwise indicates a program counter identifying an exception handler next scheduled for execution. The application state indicates an activity status (e.g., with a reference to the activity tree). The memory component 216 serializes the continuations and stores the serialized continuations in an execution journal. The continuations serialized by the memory component 216 model one or more of the following: a control flow pattern, an iteration, a parallel for each statement, a state machine, a page flow controller, a sequence generator, and another continuation. The replay component 218 re-creates, responsive to a request from the user 204, the runtime state and the application state associated with one or more of the continuations serialized by the memory component 216. When executed by the computer 206, the replay component 218 executes, within the re-created runtime state and the application state, the program fragments associated with the one or more continuations.

For example, using the reference to the continuation, an execution handler (e.g., a method associated with an activity) may schedule more execution handlers (e.g., a composite activity may schedule the execution of its children). In one embodiment, the reference to the continuation includes the activity execution context as a direct or implicit argument. Compensation of the successfully completed activities may be executed in the future by re-invoking the persisted context and executing the compensator method of the activity instance within the context.

Any of the elements in FIG. 2, the other figures, and language herein constitute means for managing the generated plurality of continuations.

Figure 3:
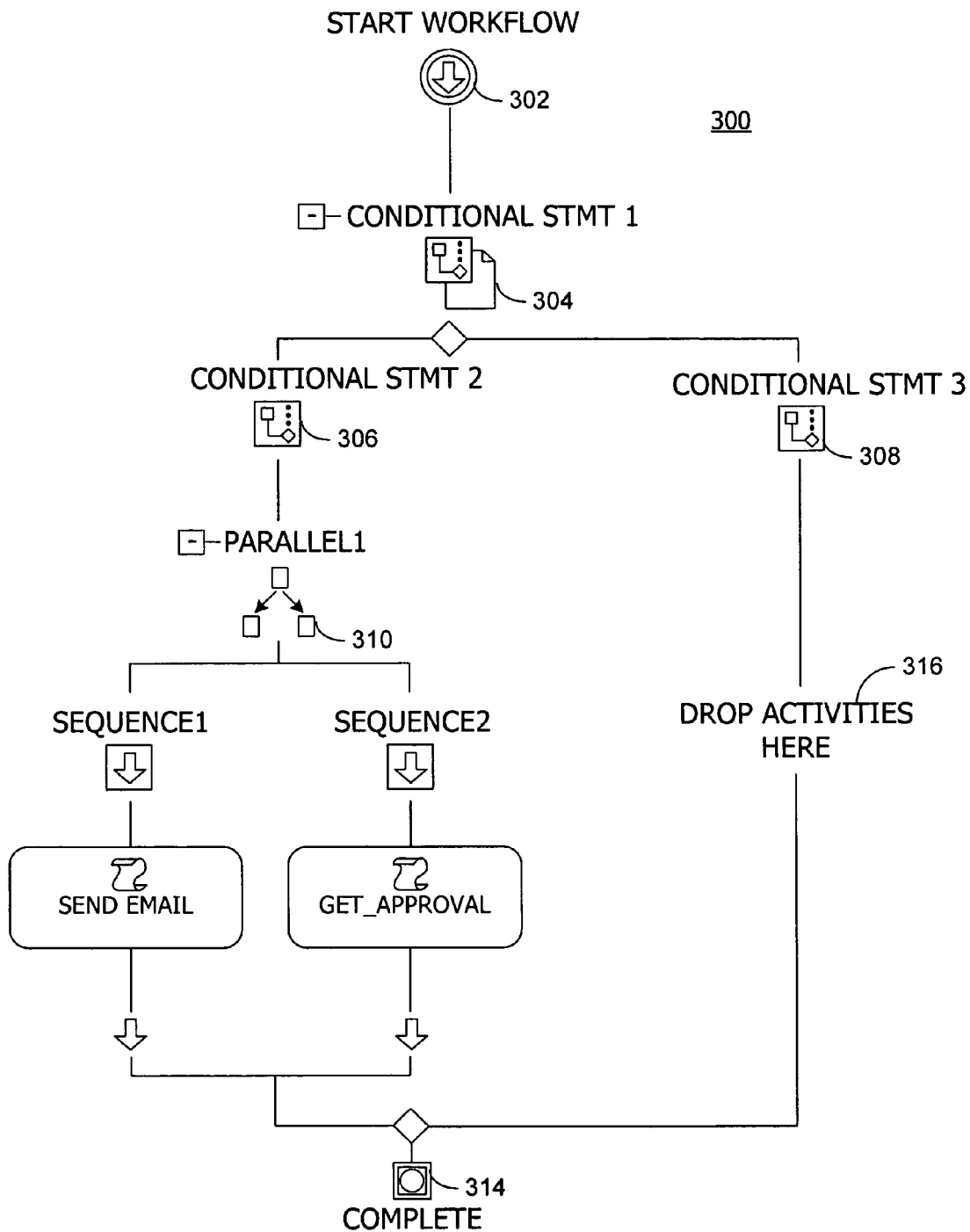
FIG. 3 is an exemplary block diagram illustrating a workflow according to an embodiment of the invention.

Referring next to FIG. 3, an exemplary workflow 300 is shown. In the example of FIG. 3, the workflow 300 is a workflow for processing a purchase order. The activities in the workflow may be sequenced such that some of the activities may be performed parallel to or simultaneous with other activities in the workflow 300, while some of the activities in the workflow 300 are executed after completion of other activities in the workflow 300. The workflow 300 starts from a starting point 302 such as the receipt of an order from a customer. The workflow 300 includes a conditional statement 304 (e.g., an IF statement or a WHILE statement) which branches into conditional statements 306 and 308 depending on the outcome of the condition in conditional statement 304. Following conditional statement 306, the workflow 300 includes a parallel structure 310 having two sequences to be executed asynchronously. In the example shown in FIG. 3, a "Send Email" activity and a "Get Approval" activity are processed in parallel before the workflow completes at 314.

After conditional statement 308, a "drop activities here" area 316 indicates that the activity writer or other user may add activities into the workflow 300 before the workflow completes at 314.

Figure 4:
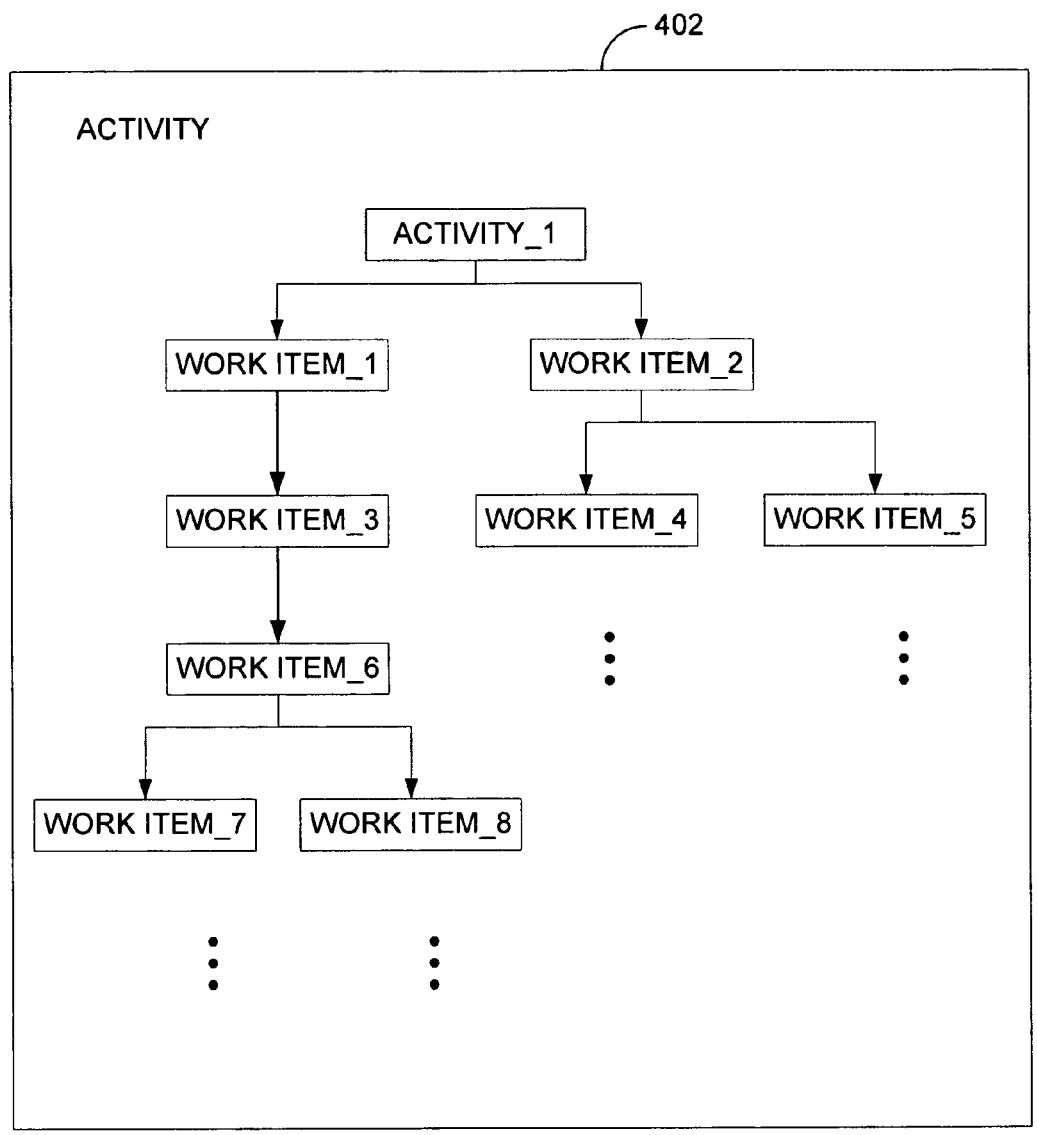
FIG. 4 is a diagram illustrating a hierarchical structure of a workflow activity according to an embodiment of the invention.

Referring next to FIG. 4, a block diagram illustrates a hierarchical structure 402 (e.g., a tree structure) of a workflow activity. Execution of the activity includes execution of the activity tree starting at the root of the tree. The activity may be configured by software code in any programming language. For example, the software code may represent business or application logic or rules written in a specific domain or execution environment. The activity may include one or more work items or other activities implementing the logic or rules. In the embodiment of FIG. 4, the activities and associated work items are arranged and executed according to the structure 402 or other execution sequence.

The meta-runtime engine defines a scope or boundary for each of the work items associated with an activity. This scope or boundary includes and exposes information (e.g., in the form of data, metadata, or the like) such as the shared data or resources to be accessed by the work items, associated properties, handlers, constraints, events, and the like.

Figure 5:
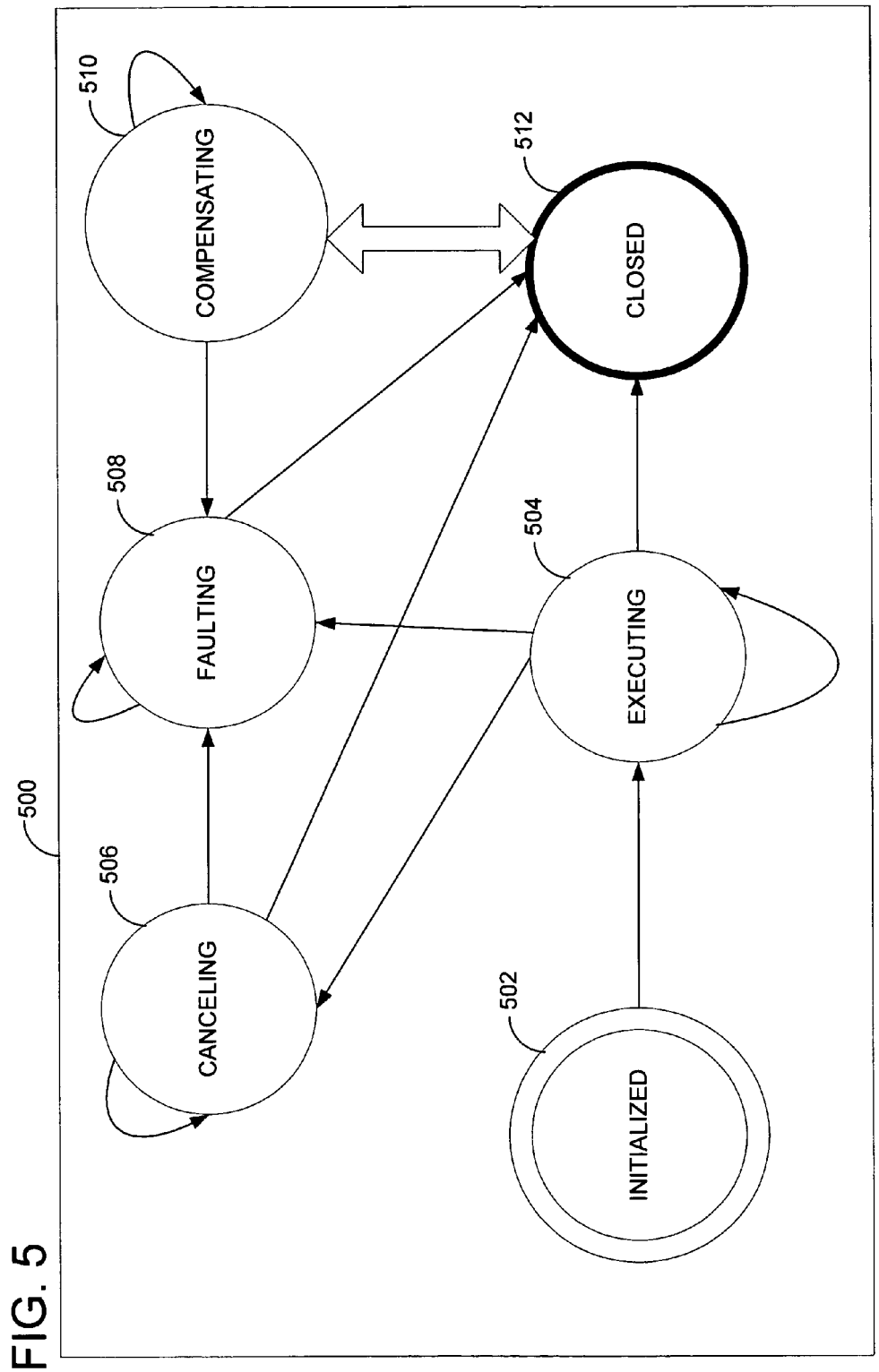
FIG. 5 is a diagram illustrating an exemplary state automaton for an activity according to an embodiment of the invention.

Referring next to FIG. 5, an exemplary state automaton defines a set of states through which an activity may transition. Generally, the state automaton 500 defines an execution lifetime for the activity. In the exemplary automaton of FIG. 5, the activity transitions through the defined set of states as the meta-runtime engine executes the activity and evaluates transitions conditions. The meta-runtime engine enforces execution of the activity per the abstract automaton. In one embodiment, the execution of an activity is performed in terms of the states in the automaton 500 and the specific possible transitions for each of the states.

One exemplary automaton includes an initialized state, an executing state, and a closed state. In the example of FIG. 5, the state automaton 500 includes an initialized state 502, an executing state 504, a canceling state 506, a faulting state 508, a compensating state 510, and a closed state 512. In another embodiment, one or more additional states may be defined in the state automaton 500 without departing from the scope of embodiments of the invention.

In general, the state automaton 500 has one or more transition conditions defining transition of the activity through the set of states. In one embodiment, if a first automaton is associated with a first activity and a second automaton is associated with a second activity, a transition condition of the first automaton of the first activity may be dependent on a current state of the second automaton of the second activity.

Further, the state automaton 500 may establish one or more relationships between work items or activities in a composite activity. For example, one of the relationship rules may include that, before transitioning methods or work items in the root node of the activity tree to the closed state 512, all the work items in the children nodes should be in the initialized state 502 or the closed state 512. Another rule may specify that the work item in the root node should be in the executing state 504 before transitioning the work items in the children node of the activity tree to the executing state 504.

Figure 6:
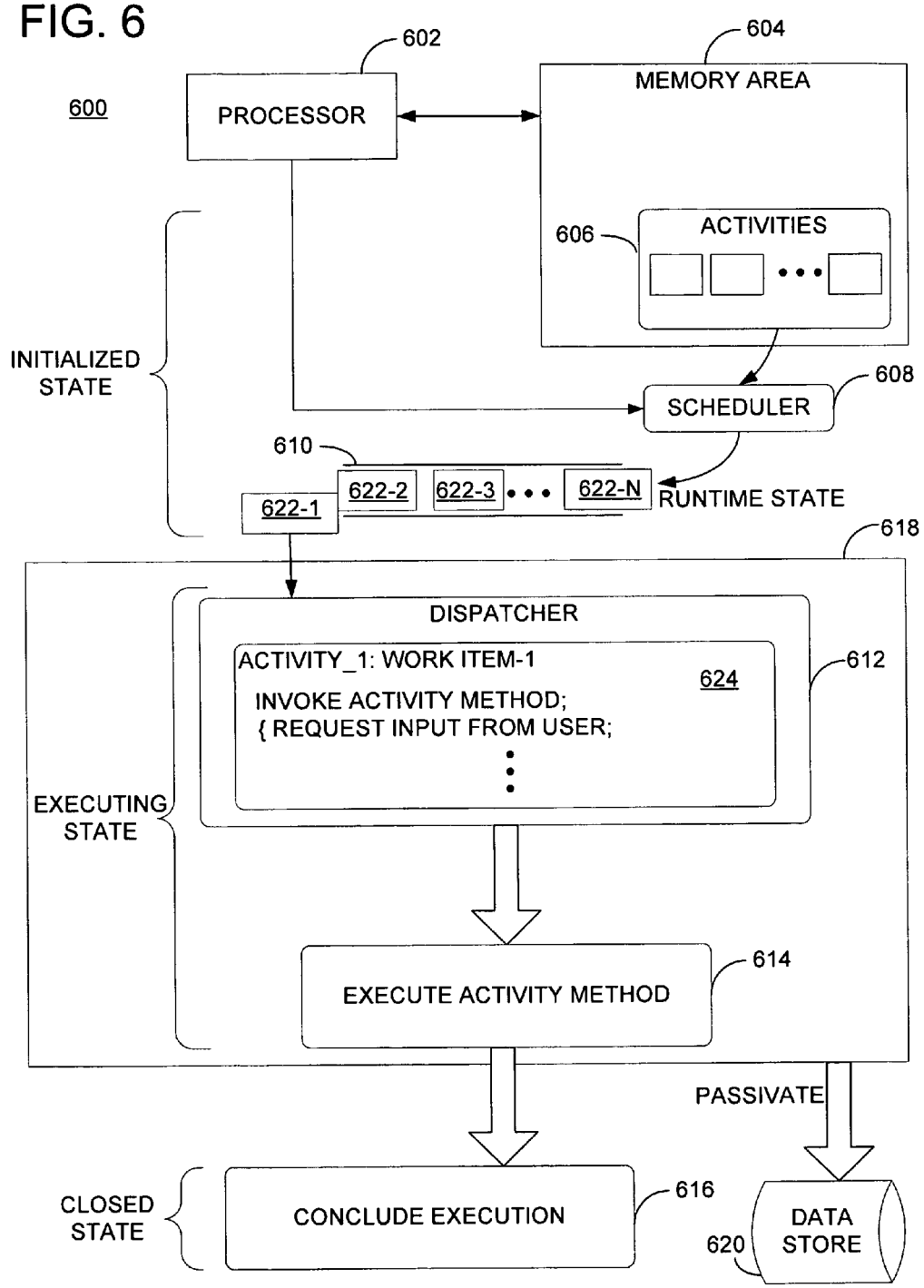
FIG. 6 is a block diagram illustrating an exemplary system for processing workflow activities according to an embodiment of the invention.

Referring next to FIG. 6, a diagram illustrates a system 600 for processing workflow activities according to an embodiment of the invention. The system 600 includes a processor 602, which may be a processing unit such as processing unit 102 in FIG. 1 or a collection of processing units. The system 600 also includes a storage or memory area 604 for storing data accessible by the processor 602. In one embodiment, the system 600 may be a computer having one or more processors or processing units (e.g., processor 602), a system memory (e.g., memory area 604), and other components to couple various system components including the processor 602 to the memory area 604.

For example, the memory area 604 stores a plurality of activities 606 for processing in a workflow (e.g., the workflow 300 in FIG. 3). Each of the plurality of activities 606 includes one or more work items, and the work items may be organized in a hierarchical structure such as a tree structure (see FIG. 4). In processing the plurality of activities 606, the processor 602 accesses or executes a scheduler 608. The scheduler 608 includes a queue 610 of work items (e.g., a workqueue) and a dispatcher 612 which dequeues the items and invoke the corresponding implementations that perform the work associated with the dequeued work item until the queue 610 is empty. Each unit of work in the queue 610 corresponds to a method implemented by an activity. The method may be referred to as the execution handler. A given activity's complete execution may span invocation and execution of a set of execution handlers enqueued in the queue 610 at an earlier point in time.

A state automaton such as state automaton 500 in FIG. 5 defines an execution flow for the work items (e.g., work items 622) in a workflow activity. The processor 608 accesses the work items in the plurality of activities 606 via a component or a set of computer-executable instructions such as the scheduler 608 to initialize the work items 622 and enqueue or store the work items 622 to a queue 610. For example, the work item 622-1, as illustrated in FIG. 6, is initialized and enqueued in the queue 610. The work item 622-1 is next dequeued or removed from the queue 610 by a dispatcher 612 before transitioning to an executing state (e.g., executing state 504 in FIG. 5) for execution.

In one example, the work item 622-1 includes an activity method or an activity operation 624, routine, or a collection of codes for performing a function of "requesting input from a user". One or more other activity methods, activity operations, routines, or codes may be included in each of the work items 622 without departing from the scope of aspects of the invention.

As the dispatcher 612 dispatches the work items 622, the processor 602 executes the methods 624 in each of the work items 622 at 614. In the example of work item 622-1, the processor 602 may provide a user with a user interface (UI) to input the requested information or data. In another embodiment, the processor 602 may connect to or access an external data source for input. Upon completion of the activity method or activity operation 624, the processor 602 concludes execution of the work item 622-1 at 616.

Alternatively, the processor 602 may passivate or otherwise capture the executing state of work items (e.g., work item 622-1) at 618 to a data store 620 for subsequent retrieval and continued execution.

Depending on the parameters or conditions during the execution of the work item 622-1, the work item 622-1 may proceed to a canceling state (e.g., canceling state 506 in FIG. 5) or a faulting state (e.g., faulting state 508 in FIG. 5). In one embodiment, the work item 422-1 may proceed from the canceling state to the faulting state. In an alternative embodiment, a compensating state (e.g., compensating state 510 in FIG. 5) describes a set of operations or functions to be performed when a fault or exception has occurred.

Figure 7:
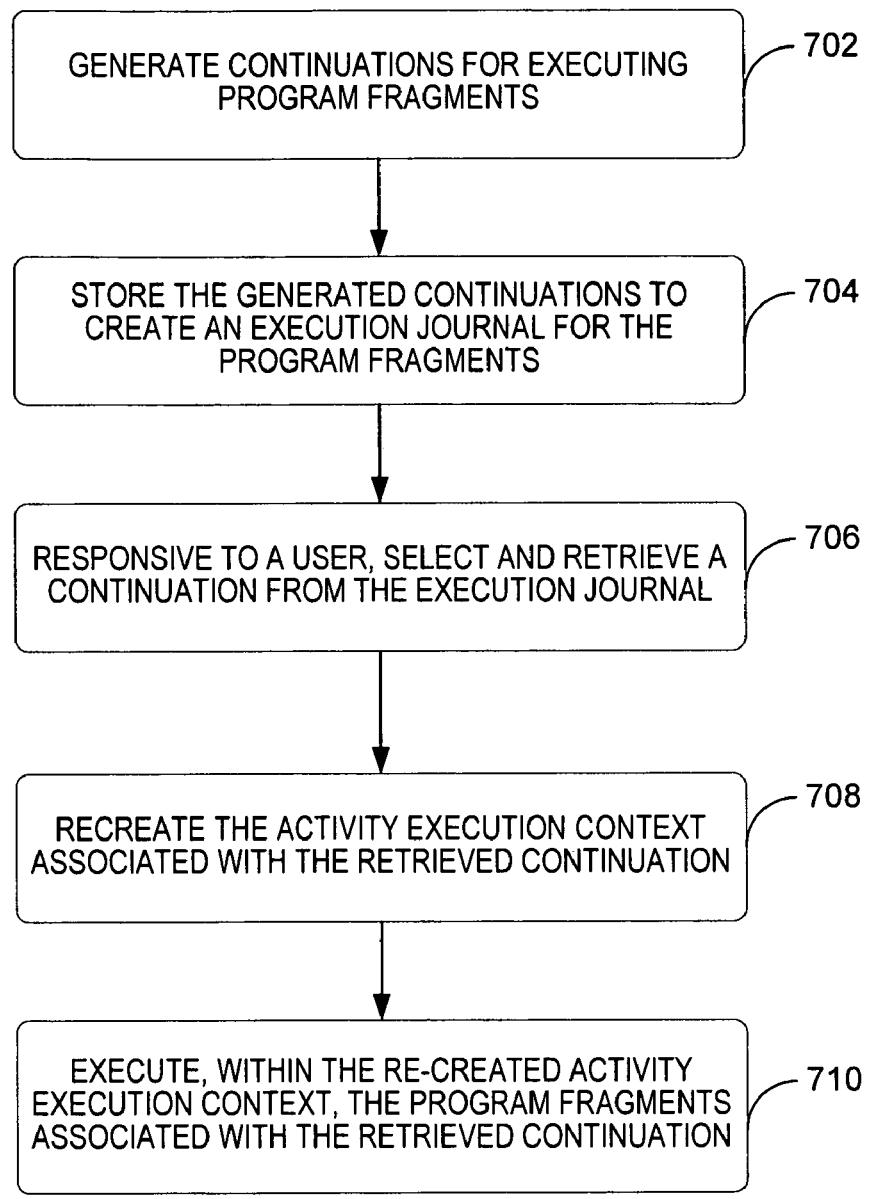
FIG. 7 is an exemplary flow chart illustrating the modeling of continuations in a workflow.

Referring next to FIG. 7, an exemplary flow chart illustrates the modeling of continuations in a workflow. The method includes generating a plurality of continuations for one or more program fragments during execution of the program fragments by a meta-runtime engine at 702. For example, the continuations may be generated responsive to a request from an activity associated with one or more of the program fragments. In one embodiment, the execution of the program fragment is episodic with each episode persisted as a continuation. The meta-runtime engine virtualizes a managed execution environment having fixed functionality. Each of the generated plurality of continuations represents an activity execution context that includes, in one embodiment, a runtime state associated with the meta-runtime engine and an application state associated with the program fragments. A data boundary for the continuations is defined by, for example, determining the extent, scoping, and binding of variables to the state in the ambient enclosing context(s).

The method stores the generated plurality of continuations at 704 to persist the selected continuation through passivation and to create an execution journal for the program fragments. In one embodiment, the continuations are stored according to an execution order of activities associated with the program fragments. The method enables the user to browse the execution journal (e.g., via an application programming interface exposed by an activity writer) and receives, from the user, a selection of the one of the stored continuations from the execution journal. The method also enables the user to sort the execution journal and to search the execution journal for continuations that are being executed and/or are not being executed.

The method further selects one of the stored continuations from the execution journal and retrieves the selected continuation responsive to a request from a user at 706. The method also recreates the activity execution context associated with the retrieved continuation at 708 and executes, within the re-created activity execution context, the program fragments associated with the retrieved continuation at 710.

Computer 206 in FIG. 2 and processor 602 in FIG. 6 are examples of general purpose computing devices. In one embodiment of the invention, a computer is suitable for use in the other figures illustrated and described herein. The computer has one or more processors or processing units and a system memory. The computer typically has at least some form of computer readable media. Computer readable media, which include both volatile and nonvolatile media, removable and non-removable media, may be any available medium that may be accessed by computer. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory includes computer storage media in the form of removable and/or non-removable, volatile and/or nonvolatile memory. The computer may also include other removable/non-removable, volatile/nonvolatile computer storage media.

The computer may operate in a networked environment using logical connections to one or more remote computers, such as a remote computer. The remote computer may be a personal computer, a server, a router, a network PC, a peer device or other common network node, and typically includes many or all of the elements described above relative to computer.

Although described in connection with an exemplary computing system environment, including computer, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, organized into one or more components or program modules, executed by one or more computers or other devices. The data processors of the computer may be programmed by means of the computer-executable instructions stored at different times in the various computer-readable storage media of the computer. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein. In operation, the computer executes computer-executable instructions such as those illustrated in the figures to implement aspects of the invention. Aspects of the invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services). The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols. The interfaces described herein may all be part of a single interface or may be implemented as separate interfaces or any combination therein. The interfaces may execute locally or remotely to provide functionality. Further, the interfaces may include additional or less functionality than illustrated or described herein.

The following examples further illustrate embodiments of the invention. A control flow is considered to be dynamic in nature when the number of children activities is not known at compile time. For instance, a composite activity that models a typical document review process sends messages to the reviewers by concurrently executing a set of primitive reviewer activities. However, the number of reviewers may not be known statically at the time the program is authored and hence the exact quantity of children of the composite activity cannot be configured at that time. In such cases, the composite activity is configured with a single reviewer activity acting as a template to generate a set of dynamic instances at execution time based on the actual reviewers available. Not only are the control flow aspects of these constructs dynamic in nature, but the runtime state, including its locality and bindings, is also dynamic. For instance, an activity that models a state machine is configured with a set of children activities that represent a state. Each state activity is a continuation that represents the state of the meta-program or the state machine frozen at a given point in time. The continuation may be executed multiple times and in arbitrary order by aspects of the invention.

Looping constructs may be viewed as special case of dynamic control flows. For example, the semantics of an activity that models a ForEach construct dictate that each iteration should create a distinct scope for the state that is contained within the ForEach activity. Scoping of the state involves the locality of the state, managing the referential integrity or binding of the states across scopes, and managing the extent or the lifetime of state enclosed in a given scope. With aspects of the invention, the program state is captured in terms of fields and dependency properties of activities in the program tree. In this manner, the notion of locals or temporary variables for activities that model looping constructs is created by effectively generating instances of activities dynamically. This captures the local state of the iteration based on the template activity that represents the body of the loop.

Further, unlike a program construct in a non-durable/non-transactional programming environment, activities may request to be compensated during subsequent program execution. For example, a successfully-completed iteration of a DoWhile activity may be compensated at a later point in its lifecycle if its parent activity faults. Aspects of the invention enable such compensation (e.g., implementing undo semantics) for each iteration by capturing and storing the execution state of the activity corresponding to each iteration as a continuation. The continuation representing the stored execution state may be invoked at a later time to make the original state of execution available when the compensating methods associated with any of the activities attempt to execute.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method for enabling creation of control flow patterns in a workflow, said method comprising:

generating, during execution of one or more program fragments by a meta-runtime engine, a plurality of continuations for each of the program fragments that have been suspended during execution, said meta-runtime engine virtualizing a managed execution environment having fixed functionality, each of the generated plurality of continuations representing an activity execution context for a corresponding suspended program fragment, each continuation permitting the corresponding suspended program fragment to subsequently resume executing from the point of suspended execution based on a user request;

storing, by the meta-runtime engine, the generated plurality of continuations to create an execution journal for the suspended program fragments, said execution journal enabling the plurality of continuations to execute multiple times and in arbitrary order;

enabling, by the meta-runtime engine, the user to browse the execution journal via an application programming interface exposed by the meta-runtime engine, said execution journal indicating which of the continuations are being executed in the managed execution environment and which of the continuations are not being executed in the managed execution environment; and receiving, by the meta-runtime engine, a selection from the user of one of the stored continuations from the execution journal for which to resume the execution of the corresponding suspended program fragment;

retrieving, by the meta-runtime engine, the selected continuation responsive to the request from a user to resume the execution of the corresponding suspended program fragment;

recreating, by the meta-runtime engine, the activity execution context associated with the retrieved continuation prior to being stored in the execution journal; and resuming, by the meta-runtime engine, execution of the suspended program fragment corresponding to the retrieved continuation within the re-created activity execution context in the managed execution environment, said retrieved continuation being made available in the journal to any user based on the virtualized execution previously executed to generate the continuations, said resuming being independent of how many times the re-created activity is executed and independent of the real-time actual platform of the user in which the re-created activity is executed via the managed execution environment.

2. The method of claim 1, wherein generating the plurality of continuations comprises capturing a runtime state associated with the meta-runtime engine and capturing an application state associated with the suspended program fragments.

3. The method of claim 1, further comprising enabling a user to browse the execution journal via an application programming interface exposed by an activity writer.

4. The method of claim 1, wherein storing the generated plurality of continuations comprises storing the generated plurality of continuations according to an execution order of activities associated with the suspended program fragments.

5. The method of claim 1, further comprising enabling the user to search the execution journal for continuations that are being executed.

6. The method of claim 1, further comprising enabling the user to search the execution journal for continuations that are not being executed.

7. The method of claim 1, further comprising enabling the user to sort the execution journal.

8. The method of claim 1, further comprising persisting the selected continuation through passivation.

9. The method of claim 1, further comprising defining a data boundary for the continuations.

10. The method of claim 9, wherein defining the data boundary comprises determining the extent, binding, and scoping of variables.

11. The method of claim 1, wherein generating the plurality of continuations comprises generating the plurality of continuations responsive to a request from an activity associated with one or more of the suspended program fragments.

12. The method of claim 1, wherein one or more computer-readable media have computer-executable instructions for performing the method of claim 1.

13. A system for modeling continuations in workflows of one or more executing computer applications, said system comprising:
a memory area for storing an execution journal representing a plurality of continuations associated with program fragments executed by an execution machine, each of the plurality of continuations representing an activity execution context for a corresponding program fragment suspended during execution by the execution machine, each continuation permitting the suspended program fragment to subsequently resume executing from the point of suspended execution; and
a processor configured to execute computer-executable instructions for executing the execution machine, said instructions comprising:
virtualizing, by a meta-runtime engine of the execution machine, a managed execution environment for the execution machine, said managed execution environment having a fixed functionality;
generating, by the meta-runtime engine, the plurality of continuations for the program fragments that have been suspended during execution of the program fragments, wherein the execution of one or more of the program fragments is episodic and each episode of program fragment execution is persisted as a continuation when the one or more of the program fragments are suspended;
storing, by the meta-runtime engine, the generated plurality of continuations in an execution journal;
providing an interface to the execution journal in the memory area, said interface including an application programming interface exposed by an activity writer;
enabling, by the meta-runtime engine, the user to browse the execution journal via an application programming interface, said execution journal indicating which of the continuations are being executed in the managed execution environment and which of the continuations are not being executed in the managed execution environment;
receiving, by the execution machine from the user, a selection of one of the stored continuations from the execution journal for which to resume the execution of the corresponding suspended program fragment;
responsive to a request for a particular continuation received via the provided interface, retrieving, by the execution machine, the particular continuation from the execution journal in the memory area to resume the execution of the suspended program fragment corresponding to the retrieved continuation;
recreating, by the execution machine, the activity execution context associated with the retrieved continuation prior to being stored in the execution journal in the managed execution environment; and
resuming execution of the suspended program fragment corresponding to the retrieved continuation, by the execution machine, within the re-created activity execution context in the managed execution environment, said retrieved continuation being made available in the journal to any user based on the virtualized execution previously executed to generate the continuations, said resuming being independent of how many times the re-created activity is executed and independent of the real-time actual platform of the user in which the re-created activity is executed via the managed execution environment.

14. The system of claim 13, wherein each of the plurality of continuations represents an execution state of one of the program fragments.

15. The system of claim 13, wherein the user comprises one or more of the following: a human, an application program, and an operating system.

16. The system of claim 13, further comprising means for managing the generated plurality of continuations.

17. One or more computer-readable storage media having computer-executable components, said components comprising:
an execution machine component for executing a plurality of program fragments associated with a workflow, said execution machine component virtualizing a managed execution environment having fixed functionality;
a state component for generating a plurality of continuations for the program fragments suspended during execution by the execution machine component, each of said plurality of continuations including a runtime state and an application state for a corresponding suspended program fragment, each continuation permitting the suspended program fragment to subsequently resume executing from the point of suspended execution based on a user request, the state component for storing the generated continuations in an execution journal, the execution journal indicating which of the continuations are being executed in the managed execution environment and which of the continuations are not being executed in the managed execution environment; said execution journal enabling the plurality of continuations to execute multiple times and in arbitrary order, said runtime state indicating a scheduler queue status, said application state indicating an activity status; and a memory component for serializing the continuations; and a replay component for re-creating, responsive to a request from a user, the runtime state and the application state associated with one or more of the continuations prior to being stored in the execution journal and serialized by the memory component and for resuming execution of the suspended program fragments corresponding to the one or more continuations within the re-created runtime state and the application state in the managed execution environment, said user request comprising a user selection of one of the stored continuations from the execution journal via an application programming interface exposed by the execution machine for which to resume the execution of the corresponding suspended program fragment, said one or more continuations being made available in the journal to any user based on the virtualized execution previously executed to generate the continuations, said replay component resuming execution of the suspended program fragments independent of how many times the re-created runtime state is executed and independent of the real-time actual platform of the user in which the re-created runtime state is executed via the managed execution environment.

18. The computer-readable media of claim 17, wherein each of the generated plurality of continuations represents an activity execution context.

19. The computer-readable media of claim 17, wherein the continuations serialized by the memory component model one or more of the following: a control flow pattern, an iteration, a parallel for each statement, a state machine, a page flow controller, a sequence generator, and a continuation.

* * * * *